Figure 1:
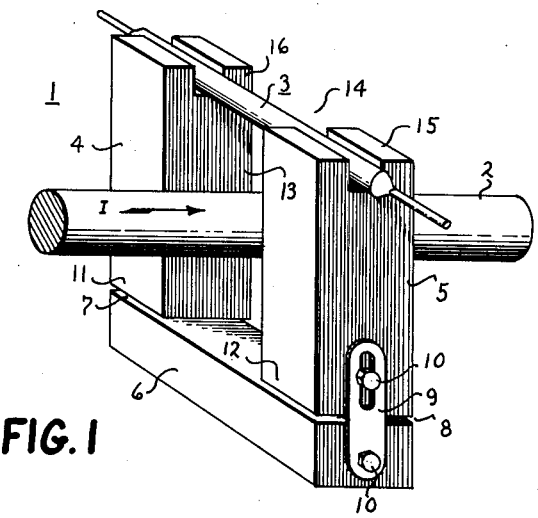

June 8, 1965   D. COOPER ETAL   3,188,427
ELECTROMAGNETIC CURRENT CARRYING SWITCH
Filed Feb. 25, 1963

INVENTORS
DAVID COOPER
LASZLO DEKORANYI
WILLIAM B. ZELINA
BY
THEIR ATTORNEY

United States Patent Office 3,188,427
Patented June 8, 1965

3,188,427
ELECTROMAGNETIC CURRENT CARRYING SWITCH
David Cooper, Laszlo De Koranyi, and William B. Zelina, Erie, Pa., assignors to General Electric Company, a corporation of New York
Filed Feb. 25, 1963, Ser. No. 260,745
10 Claims. (Cl. 200—87)

This invention relates generally to electrically controlled switching devices and more particularly to such devices which are operative in response to a magnetic field. Although this invention is subject to a wide range of applications, it is particularly suited for use as an electrically isolated current sensing device and will be particularly described in that connection.

Conventional spring biased relays have been used in the prior art to sense the current level of a current carrying circuit. Such relays, however, are not entirely satisfactory for many applications since they are subject to limitations imposed by the characteristics of the spring used in biasing the contacts thereof. Moreover, such relays do not provide a device which is electrically isolated from the current carrying circuit. For example, particularly where the current carrying conductor is at a high potential above ground, it is desirable, and sometimes necessary, that the indicating means be electrically isolated from it. Direct current transformers are used in the prior art, particularly for measuring large direct currents, in the range of thousands of amperes. While such direct current transformers have the ability to isolate the indicating circuit from the current carrying circuit, they require a separate alternating current voltage source together with associated circuitry which contributes to both the complexity and the cost of such current measuring devices. There is a continuing need in many electrical circuits and systems for an accurate and inexpensive electrically isolated device to sense current levels over a wide range of values.

It is an object of this invention, therefore, to provide an electrically isolated current sensing device which overcomes one or more of the prior art disadvantages and which is inexpensive and accurate.

Another object of this invention is to provide a new and improved electromagnetic switching device.

Another object of this invention is to provide a simple inexpensive and accurate electromagnetic switching device, particularly adapted to sense the current level in a current carrying circuit and being electrically isolated therefrom.

Briefly stated, in accordance with one aspect of this invention, we provide a new and improved electromagnetic switching device comprising a magnetic structure, adapted to link the magnetic flux about a current carrying means, and defining a magnetic circuit. The device further includes a magnetically responsive switch associated with the magnetic circuit. Means are also provided for controlling the response of the switch. Such control may be provided by adjusting one or more air gaps and/or providing a saturable section shunting the switch.

Figure 2:
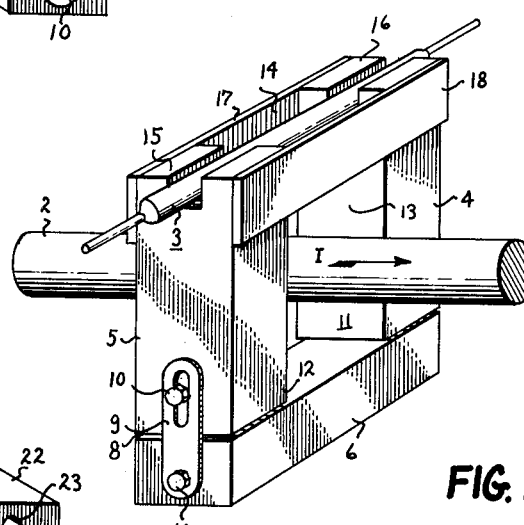
Figure 3:
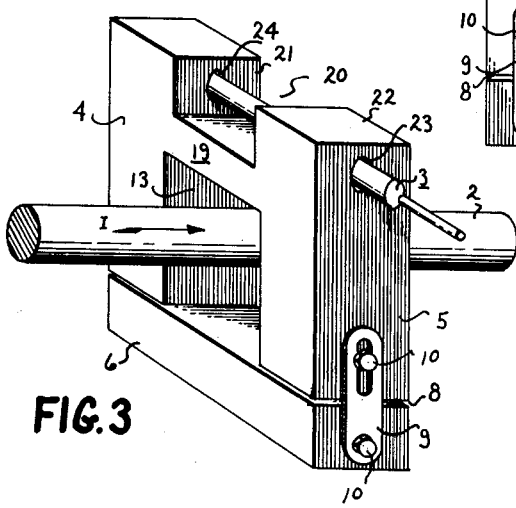

The novel features believed characteristic of this invention are set forth with particularity in the appended claims. Our invention, itself, together with further objects and advantages thereof may best be understood by reference to the following description taken in connection with the accompanying drawing in which:

FIGS. 1, 2 and 3 are perspective views illustrating different specific embodiments of this invention.

As is evident from the different figures of the drawing, the electromagnetic devices of this invention comprise the novel combination of a magnetic structure 1, adapted to link the magnetic flux of a current carrying means, such as electrical conductor 2, and a magnetically responsive switch 3, the response of which is controlled by varying the reluctance of the magnetic circuit defined by such combination. Preferably, the magnetically responsive switch 3 is of the reed-type, well known in the art, having a pair of magnetically responsive movable contacts sealed within a suitable envelope.

The magnetic circuit of the electromagnetic devices of this invention, therefore, includes a first low reluctance portion, a second portion having a reluctance which is high compared to that of the first portion and a third portion which includes a path having a reluctance which is higher than that of the second portion.

In one specific embodiment, the high reluctance path is shunted by a magnetically responsive switch to provide a third portion having an equivalent reluctance no greater than the reluctance of the second portion. In another specific embodiment, the high reluctance path is shunted by a saturable section and a magnetically responsive switch to provide, at saturation, a third portion having an equivalent reluctance no greater than the reluctance of the second portion and prior to saturation a third portion having an equivalent reluctance which is lower than the reluctance of the second portion.

Referring to FIG. 1, there is shown a diagrammatic illustration of one embodiment of this invention arranged as a current sensing device to indicate the current level in current carrying conductor 2. For simplicity, the power supply supplying current to conductor 2 and the utilization means connected to the magnetically responsive switch are not shown. As shown, the magnetic structure 1 includes ferromagnetic sections 4 and 5, which may be solid or of laminated construction, spaced from and adjustably fastened to a similar ferromagnetic section 6 in any conventional manner to form adjustable air gaps 7 and 8 therebetween. For example, sections 4 and 5 may be conveniently adjustably fastened to section 6 by nonmagnetic slotted plates 9 and the screws 10. Various other arrangements of providing adjustable air gaps in magnetic structures are well known in the art and need not be described herein in detail. Moreover, it will be understood by those skilled in the art that although in FIG. 1 two air gaps are illustrated, one or more such air gaps may be employed.

The ends 11 and 12 of sections 4 and 5, therefore, form adjustable air gaps 7 and 8 with the section 6 while a large air gap 14 is established between the ends 15 and 16 respectively of sections 4 and 5. The magnetic structure so formed, has an opening 13 through which a current carrying conductor 2 may pass and defines a magnetic circuit having a flux path through section 4, across adjustable air gap 7, through section 6, across adjustable air gap 8, through section 5 and across the air gap 14. Magnetically responsive switch 3 bridges the air gap 14 and operates in response to the magnetic field thereacross, the intensity of which for a given current flow in conductor 2 is controlled by adjustment of the air gaps 7 and 8.

For simplicity, the magnetic circuit of the electromagnetic device of FIG. 1 may be viewed, for example, as having three different portions. One portion comprises the high-permeability ferromagnetic material of the sections 4, 5 and 6 and is, therefore, a low reluctance portion. The second portion includes the adjustable air gaps 7 and 8, the reluctance of which portion is high compared to the reluctance of the first portion. The third portion comprises the large air gap 14 in combination with the magnetically responsive switch 3 which bridges it. The reluctance of this third portion is arranged to be no greater than the reluctance of the second section and preferably less. For example, in a typical device, the reluctance of the second portion may be at least 100 times the reluctance of the first portion and the reluctance of the third portion may be about equal to or 1/10 the reluctance of the second portion.

In operation, air gaps 7 and 8 are adjusted to provide for operation of the magnetically responsive switch 3 when the current in conductor 2 reaches a predetermined level. For example, a typical reed-type switch requires about 90 ampere turns for operation and the magnetic structure 1 makes it possible to obtain sufficient magnetic lines to control the operation of the switch from the flux produced about conductor 2 by the current flowing therein. The magnetic flux about conductor 2 links the magnetic structure 1 and concentrates the flux set up by the current in conductor 2.

The magnetic circuit of the device consists throughout most of its length of the high-permeability material of the sections 4, 5 and 6 in which the flux is largely confined. The high-permeability portion of the flux circuit is interrupted by the adjustable air gaps 7 and 8 and air gap 14 which is bridged by the magnetically responsive switch 3. Adjustment of the air gaps 7 and 8, therefore, provides control to assure operation of the switch 3 at a selected value of current in conductor 2. As stated hereinbefore, only one adjustable air gap is required to provide the necessary control of the switch 3 although more than one may be conveniently employed.

In FIG. 2 there is shown another embodiment of this invention wherein control of the magnetically responsive switch 3 is provided by the adjustable air gaps 7 and 8 in combination with a saturable portion shunting the switch. As shown, this saturable portion may be provided by the ferromagnetic sections 17 and 18 of restricted cross section shunting the air gap 14.

The adjustable air gap determines the flux level in the magnetic sections 17 and 18 as a function of the current passing through conductor 2. If this air gap has a length which is small compared to the length of the saturable portion of the magnetic circuit, once the sections 17 and 18 saturate, almost all the ensuing ampere turns applied to the device will appear across the switch 3 itself. For example, after saturation, the sections 17 and 18 appear as a very high reluctance path shunted by the equivalent air gap between the ends 15 and 16 bridged by switch 3. By controlling the saturation of the sections 17 and 18, therefore, the characteristic of switch 3, that is the point at which it is rendered operative, can be extended to many times its original value.

FIG. 3 illustrates yet another embodiment of this invention. The device of FIG. 3 is similar to that of FIG. 2 wherein a saturable portion is provided by the restricted section 19 shunting the magnetically responsive switch 3 and the air gap 20 between the ends 21 and 22. The operation of the device of FIG. 3 is the same as that of FIG. 2 described in detail hereinbefore. In addition, in this embodiment the magnetically responsive switch 3 is positioned within the closed apertures 23 and 24 formed in the ends 21 and 22 of magnetic structure 1. Positioning switch 3 within the closed apertures provides shielding for the switch and improves the operation of the device which is desirable for some applications particularly where external sources of M.M.F. or magnetic materials are in proximity to the device. If shielding problems are extremely critical, apertures 23 and 24 may be located so that switch 3 passes through section 19. In addition such construction makes alignment of the magnetically responsive switch 3 less critical.

In the embodiments illustrated in FIGS. 2 and 3, control of the operation of the magnetically responsive switch is provided by the combination of an adjustable air gap and a saturable portion shunting the magnetically responsive switch. In the absence of saturation of the saturable portion, the magnetic circuit may be viewed, as before, as having three portions. The first portion, made up of the essentially uniform cross section ferromagnetic material, has a low reluctance. The second portion is made up of the adjustable air gap and has a high reluctance compared to that of the first portion. The reluctance of the third portion is made up of the high reluctance path in shunt with the switch and the saturable section. The equivalent reluctance of this third portion prior to saturation, is determined essentially by the reluctance of the restricted ferromagnetic saturable section and, therefore, it is low compared to that of the second portion. After saturation, however, the restricted saturable section exhibits a high reluctance and the equivalent condition of that described in FIG. 1 obtains whereby the equivalent reluctance of this third portion is no greater, and preferably less than, the reluctance of the second portion since the reluctance is again determined essentially by an air gap bridged by the magnetically responsive switch 3. This air gap, for example, is between the ends 15 and 16 in FIG. 2 and between the ends 21 and 22 in FIG. 3 and is bridged by magnetically responsive switch 3. It will be understood, however, that this air gap, restricted section and adjustable air gaps may be provided in the section 6 by suitable construction thereof.

The total necessary applied M.M.F. of the magnetic structure to produce saturation in the restricted section can be varied by adjustment of one or more air gaps in the magnetic structure, by applying one or more permanent magnets to provide bias therefor, by shunting flux through one or more additional magnetic paths or a combination of such means.

It is to be understood that although we have shown particular embodiments of our invention, many changes and modifications may be made, and we intend, therefore, by the appended claims to cover all such changes and modifications as fall within the true spirit and scope of the claims.

What is claimed as new and desired to secure by Letters Patent of the United States is:

1. An electromagnetic device comprising: a magnetic structure adapted to fit about and link the magnetic flux about a current carrying means, said magnetic structure defining a magnetic circuit including in series relation a first magnetic flux path portion having a low reluctance, a second magnetic flux path portion having a reluctance which is high compared to the reluctance of said first flux path portion and a third magnetic flux path portion having a reluctance higher than that of said second flux path portion; a magnetically responsive switch shunting said third magnetic flux path portion; and means for varying the reluctance of said magnetic circuit to control the response of said switch with respect to the current in said current carrying means.

2. The electromagnetic device of claim 1 wherein said first magnetic flux path portion comprises the material of said magnetic structure, said second magnetic flux path portion comprises at least one variable air gap and said third magnetic flux path portion comprises an air gap.

3. The electromagnetic device of claim 2 wherein said third magnetic flux path portion is an ai rgap shunted by a saturable region of magnetic material.

4. The electromagnetic device of claim 2 wherein the reluctance of said magnetic circuit is varied by adjustment of said variable air gap path.

5. An electromagnetic device comprising: a ferromagnetic structure adapted to fit about and link the magnetic flux about a current carrying means, said structure comprising a first generally H-shaped member having the bridging portion thereof being of a reduced cross section and a second member adjustably secured to an open end of said H-shaped member and defining at least one adjustable air gap therewith; a magnetically responsive switch shunting the portion of reduced cross section; and means for adjusting the length of said adjustable air gap to control the response of said switch with respect to the current in said current carrying means.

6. An electromagnetic device comprising: a magnetic structure defining a magnetic circuit and being adapted to fit about and link the magnetic flux of a current carrying means, said structure including a first member of magnetic material of a generally H-shape having the bridging portion thereof of reduced cross section and a second member of magnetic material adjustably secured across an open end and defining at least one adjustable air gap with the legs of said H-shape member; a magnetically responsive switch located adjacent to and shunting the bridging portion of said H-shaped member; and means for varying the magnetic flux acting on said magnetically responsive switch to control the response of said switch with respect to the current in said current carrying means.

7. An electromagnetic switch device for sensing the current level in a current carrying means comprising: a magnetic structure having an opening therethrough formed to receive a current carrying means so that said magnetic structure is adapted to fit about and link the magnetic flux about said current carrying means to establish a magnetic circuit having first, second and third portions in series relationship with the flux produced in said magnetic circuit being related to the flux produced about said current carrying means by the current flowing therein, the third portion of said magnetic structure having a reluctance which is higher than that of said second portion which is in turn high compared to that of said first portion; and a magnetically responsive switch shunting the third portion of said magnetic circuit so that the equivalent reluctance of said third portion shunted by said switch is no greater than the reluctance of said second portion.

8. The electromagnetic switch of claim 7 wherein said third portion is also shunted by a region of saturable magnetic material to cause the equivalent reluctance of said third portion to be less than the reluctance of said second portion when said region is in an unsaturated condition and no greater than that of said second portion when said region is in a saturated condition.

9. The electromagnetic switch of claim 7 wherein the reluctance of said second portion is about 100 times greater than that of said first portion and the reluctance of said third portion is in the range of from about $\frac{1}{10}$ of to about equal to the reluctance of said second portion.

10. The electromagnetic switch of claim 8 wherein the reluctance of said second portion is about 100 times greater than that of said first portion and the reluctance of said third portion is in the range of from about $\frac{1}{10}$ of to about equal to the reluctance of said second portion.

References Cited by the Examiner
UNITED STATES PATENTS

| | | | |
|---|---|---|---|
| 593,230 | 11/97 | Moore | 317—177 |
| 730,371 | 6/03 | Hewlett | 200—87 |
| 1,400,126 | 12/21 | Wotton | 200—90 |
| 1,930,528 | 10/33 | Marthens | 200—87 |
| 2,282,933 | 5/42 | Cahill | 317—177 |
| 2,342,781 | 2/44 | Aamodt | 200—90 |
| 2,443,784 | 6/48 | Bullen et al. | 317—177 |
| 2,484,863 | 10/49 | Stillwell | 200—87 |
| 2,761,075 | 8/56 | Mas | 200—90 |
| 3,008,020 | 11/61 | Mason | 200—87 |

BERNARD A. GILHEANY, *Primary Examiner.*

ROBERT K. SCHAEFER, *Examiner.*